United States Patent
Lambert

(10) Patent No.: US 7,924,519 B2
(45) Date of Patent: Apr. 12, 2011

(54) ECCENTRICITY DETERMINATION FOR A DISK

(75) Inventor: Steven E. Lambert, San Jose, CA (US)

(73) Assignee: WD Media, Inc., San Jose, CA (US)

(*) Notice: Subject to any disclaimer, the term of this patent is extended or adjusted under 35 U.S.C. 154(b) by 206 days.

(21) Appl. No.: 12/240,139

(22) Filed: Sep. 29, 2008

(65) Prior Publication Data
US 2010/0079888 A1 Apr. 1, 2010

(51) Int. Cl.
*G11B 27/36* (2006.01)
(52) U.S. Cl. ............ 360/31; 360/77.04
(58) Field of Classification Search .......... None
See application file for complete search history.

(56) References Cited

U.S. PATENT DOCUMENTS

| | | | |
|---|---|---|---|
| 4,985,882 A | 1/1991 | Tanaka et al. | |
| 5,297,131 A | 3/1994 | Tanaka | |
| 5,585,989 A | 12/1996 | Kuromiya et al. | |
| 5,723,033 A | 3/1998 | Weiss | |
| 5,761,165 A | 6/1998 | Takeda et al. | |
| 5,905,705 A | 5/1999 | Takeda et al. | |
| 5,995,318 A | 11/1999 | Hasegawa et al. | |
| 6,128,153 A | 10/2000 | Hasegawa et al. | |
| 6,139,936 A | 10/2000 | Weiss | |
| 6,698,286 B1 | 3/2004 | Little et al. | |
| 6,714,492 B2 | 3/2004 | Kim | |
| 6,757,116 B1 | 6/2004 | Curtiss et al. | |
| 6,971,154 B2 | 12/2005 | Yoo et al. | |
| 6,972,540 B1 | 12/2005 | Wang et al. | |
| 7,005,849 B2 | 2/2006 | Tse et al. | |
| 7,012,777 B1* | 3/2006 | Hirano et al. | 360/77.03 |
| 7,068,451 B1 | 6/2006 | Wang et al. | |
| 7,075,746 B1 | 7/2006 | Kupferman | |
| 7,099,100 B2* | 8/2006 | Byun et al. | 360/69 |
| 7,265,933 B1 | 9/2007 | Phan et al. | |
| 7,324,300 B2 | 1/2008 | Hara | |
| 7,333,287 B2 | 2/2008 | Hara | |
| 7,365,927 B2 | 4/2008 | Takamatsu et al. | |
| 7,450,335 B2* | 11/2008 | Hirano et al. | 360/77.03 |
| 2003/0021051 A1* | 1/2003 | Suzuki et al. | 360/53 |
| 2004/0174636 A1 | 9/2004 | Suzuki et al. | |
| 2005/0007919 A1* | 1/2005 | Takamiya et al. | 369/47.36 |
| 2005/0036223 A1 | 2/2005 | Wachenschwanz et al. | |
| 2005/0057837 A1 | 3/2005 | Takamatsu et al. | |
| 2005/0158163 A1 | 7/2005 | Harper et al. | |
| 2006/0066994 A1 | 3/2006 | Suzuki et al. | |
| 2006/0158767 A1 | 7/2006 | Toyoda | |

FOREIGN PATENT DOCUMENTS

JP 06-342578 12/1994

OTHER PUBLICATIONS

Gunhee Jang et al., "New Frequency Domain Method of Nonrepeatable Runout Measurement in a Hard Disk Drive Spindle Motor", IEEE Transactions of Magnetics, vol. 35, No. 2, pp. 833-838, Mar. 1999.

* cited by examiner

*Primary Examiner* — Jason C Olson

(57) ABSTRACT

Monitoring of the eccentricity of a pre-formatted servo pattern on a disk.

18 Claims, 6 Drawing Sheets

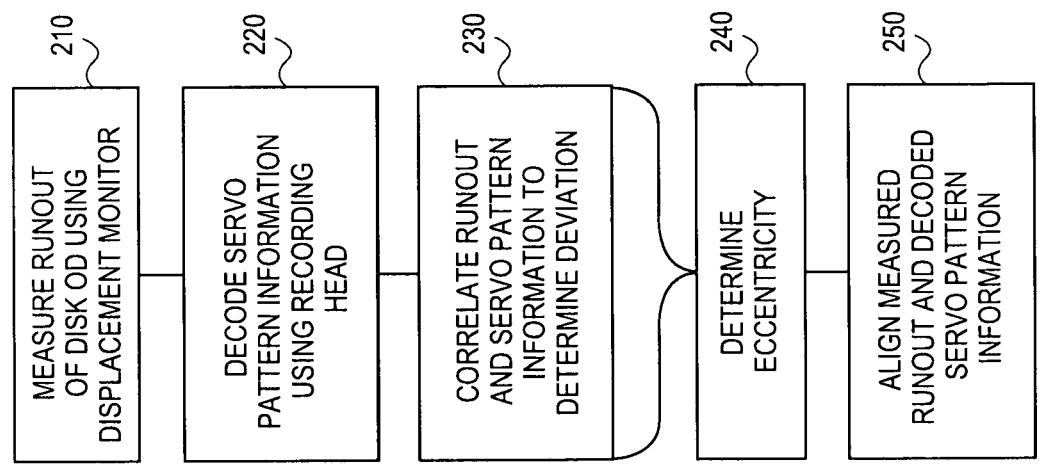
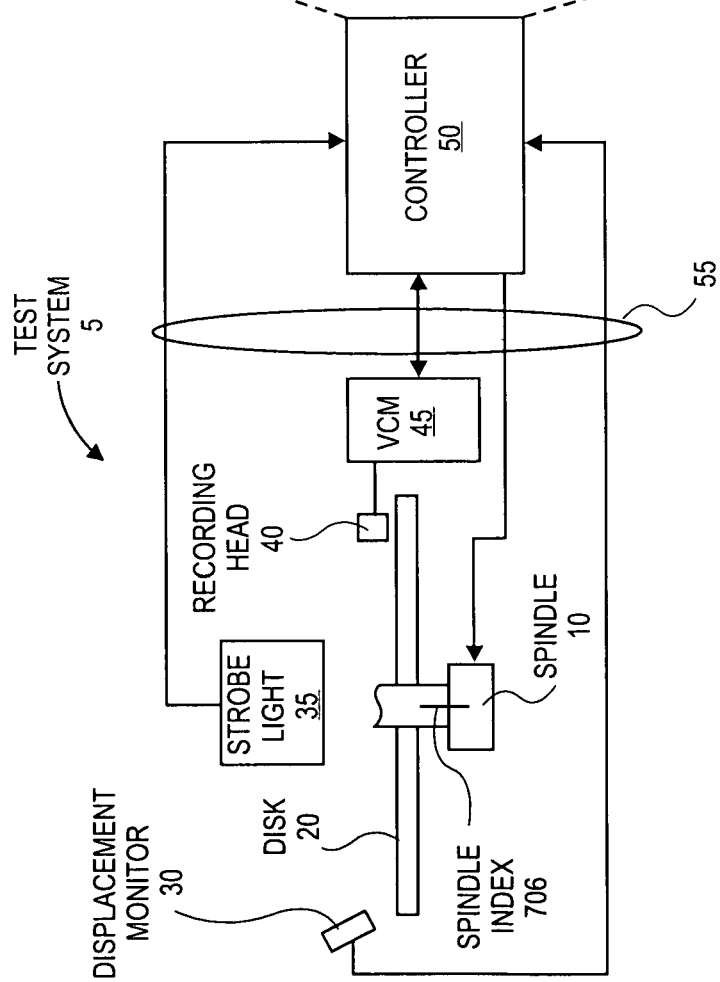

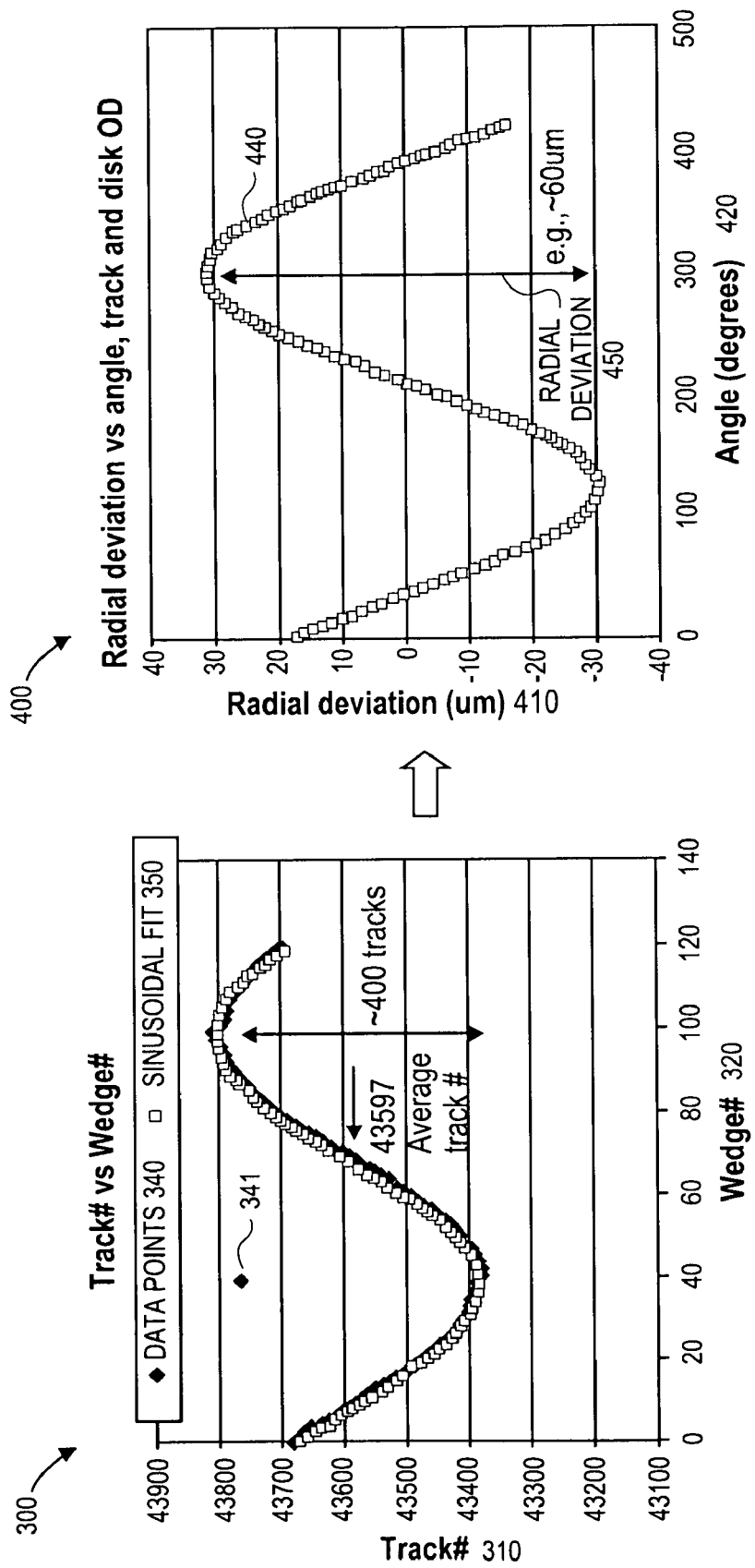

ECCENTRICITY DETERMINATION FOR A DISK

TECHNICAL FIELD

Embodiments described herein relate to the field of disk manufacturing, more particularly, to eccentricity determination of a disk's preformatted servo information.

BACKGROUND

A disk drive system includes one or more magnetic recording disks and control mechanisms for storing data within approximately concentric tracks on the disk. The magnetic recording disk surface includes a number of radially spaced, concentric tracks, where each track is divided into a number of data sectors. A number of embedded servo sectors forming servo wedges may also be written on each disk surface, which facilitates seeking the head and maintaining the head over the centerline of a target track during read and write operations. The disks are rotated at a constant angular velocity, for example, while varying the data rate from an inner diameter edge to an outer diameter edge of the disk to maximize the recording density.

During the disk manufacturing process, the embedded servo information is preformatted into a pattern on the disk. Conventional servo pre-formatting processes may result in preformatted servo pattern information being eccentric relative to the center of the disk. Conventional methods of pre-formatting servo information including magnetic printing and discrete track media (DTM) process. Both processes rely on a press to mechanically align the servo pattern with the center of the disk. The offset of the center of the pattern relative to the center of the disk is referred to as "eccentricity."

One conventional method of determining the eccentricity of a disk involves the use of an indicator to measure the runout of the outer diameter (OD) of the disk on the spindle of a spindle stand. The disk is tapped until the OD is determined to be well centered. The spin stand is used to measure the runout of the servo pattern by decoding the servo pattern wedge number and track number. This is not a practical method of determining eccentricity in a manufacturing environment because of the excess time in the factory that would be required to mechanically center every disk that is desired to be measured in a monitoring process.

BRIEF DESCRIPTION OF THE DRAWINGS

Embodiments are illustrated by way of example, and not limitation, in the figures of the accompanying drawings in which:

FIGS. 1A and 1B are top and cross sectional views, respectively, illustrating a test system for determining eccentricity of a servo pattern of a disk, according to one embodiment of the present invention.

FIG. 2 illustrates one embodiment of a method of determining disk eccentricity.

FIG. 3 is a plot illustrating an example runout of pre-formatted servo pattern information of a disk, according to one embodiment of the present invention.

FIG. 4 is a plot illustrating an example conversion of servo wedge data to a radial deviation, according to one embodiment of the present invention.

DETAILED DESCRIPTION

Embodiments of the apparatus and methods are described herein with reference to figures. However, particular embodiments may be practiced without one or more of these specific details, or in combination with other known methods, materials, and apparatuses. In the following description, numerous specific details are set forth, such as specific materials, dimensions and processes parameters etc. to provide a thorough understanding. In other instances, well-known fabrication processes and integration techniques have not been described in particular detail to avoid unnecessarily obscuring the claimed subject matter. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment. Furthermore, the particular features, structures, materials, or characteristics may be combined in any suitable manner in one or more embodiments.

It should be noted that the "line" or "lines" discussed herein, that connect components, may be single lines, multiple lines or a bus. It will also be understood by one having ordinary skill in the art that lines or other coupling elements may be identified by the nature of the signals they carry (e.g., a "command line" may implicitly carry a "command signal") and that input and output ports may be identified by the nature of the signals they receive or transmit (e.g., "command input" may implicitly receive a "command signal").

The methods and apparatus herein may provide for the monitoring of the eccentricity of a pre-formatted servo pattern on a disk, for example, to ensure that a servo pattern formation tool is set up properly or stays in alignment during operation over multiple disks.

Figure 1A:
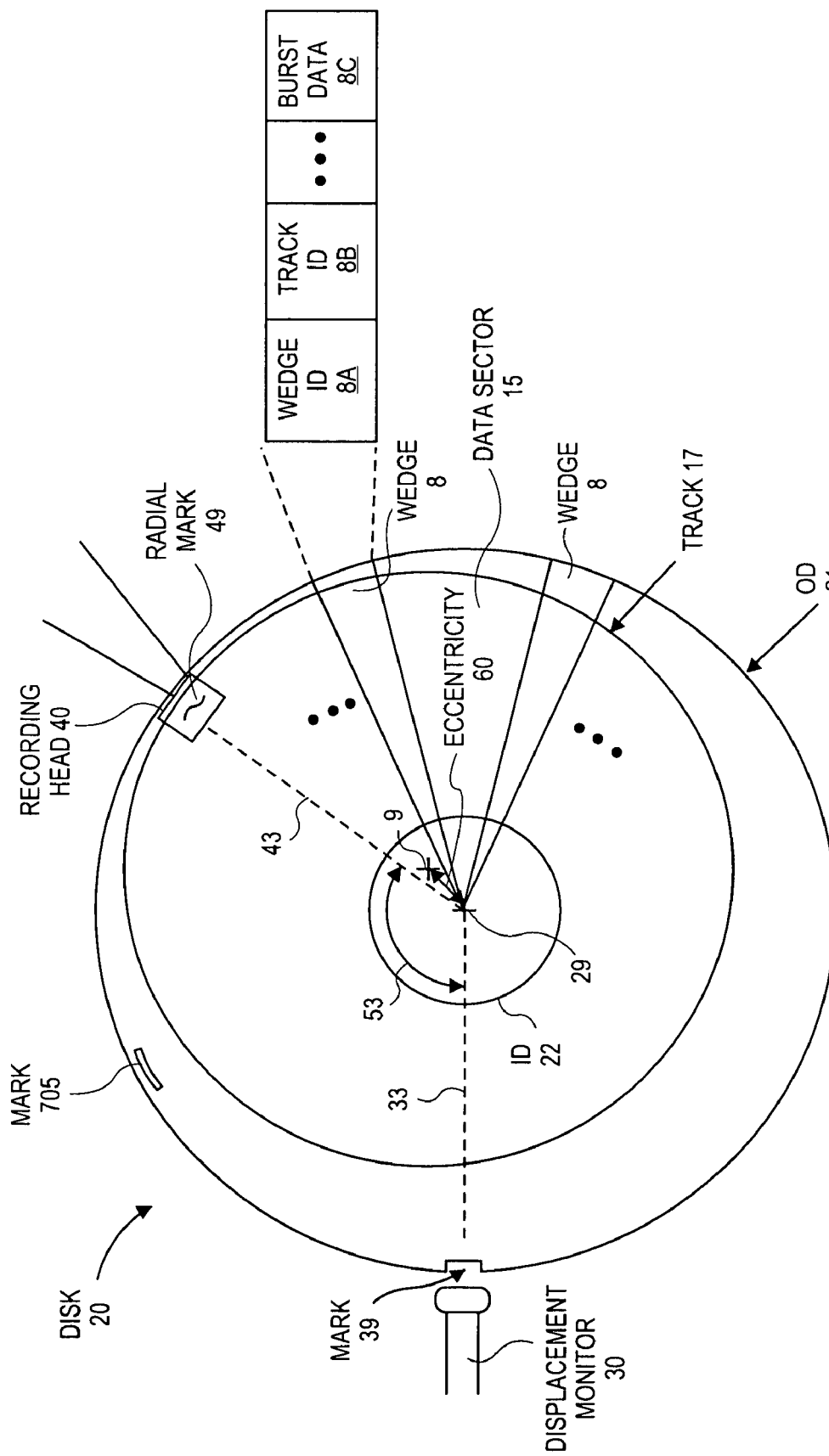

FIGS. 1A and 1B are top and cross sectional views, respectively, illustrating a test system for determining eccentricity of a servo pattern of a disk, according to one embodiment of the present invention. The test system 5 includes a spindle 10 for securing and rotating a disk 20, a displacement monitor 30, a recording head 40 coupled with a voice coil motor (VCM) 45 for moving head 40, and a controller 50. Controller 50 is coupled with spindle 10, VCM 45, and displacement monitor 30 for controlling the movement of the spindle 10, the recording head 40, and communicating with the displacement monitor 30. In one particular embodiment, test system 5 may also include a strobe light 35 as discussed below in regards to FIG. 7. Although the controller 50 is illustrated as a single component, in alternative embodiments, the operations of controller 50 may be performed by multiple different components, for example, one or more general-purpose processors (e.g., a microprocessor), special purpose processor such as a digital signal processor (DSP) or other type of device such as a field programmable gate array (FPGA). Controllers and the other types of processing devices described above are known in the art; accordingly, a further detailed description is not provided herein. The controller may communicate data and commands with one or more of displacement monitor 30, spindle 10, VCM 45, and strobe light 35 over lines 55. It should be noted that test system 5 may also include other components such as memory, storage devices, etc. that are not shown so as not to obscure an understanding of embodiments of the present invention.

Although disk 20 is not considered part of test system 5, the disk is operated on by the embodiments of the apparatus and method described herein. Accordingly, a brief discussion of the structure of disk 20 is provided for an understanding of the methods and apparatus described herein.

Disk 20, having an inner diameter (ID) 22 and an outer diameter (OD) 21, includes a plurality of concentric data tracks (e.g., track 17) angularly divided into a plurality of data sectors (e.g., data sector 15). In addition, servo information may be provided on disk 20 to determine the position of a moveable recording head. One type of servo information is called "embedded servo" wherein the servo information is written in a plurality of servo wedges 8 that are angularly spaced from one another and are interspersed between data sectors (e.g., data sector 15) around each track of disk 20. Each of the servo wedges 8 may have one or more fields including, for example, a wedge identification field 8a having a binary encoded wedge identification number (#) to identify the wedge (e.g., 0 to the number of wedges/revolution), track identification number field 8b and a group of servo bursts, or burst data, field 8c (e.g. an alternating pattern of magnetic transitions) which the servo control system samples to align a recording head with, or relative to, a particular track. In alternative embodiments, the servo wedges 8 may have other fields and the fields may be arranged in other orders than illustrated in FIG. 1A. Eccentricity 60 associated with rotating disk 20 results in associated eccentricity of read servo wedges 8 upon which the servo control system operates. When servo information is put onto the disk 20 and mounted in a disk drive, the servo pattern information may not be properly aligned resulting in eccentricity associated with the rotating disk. As such, the servo pattern may not be at the center of rotation of the disk 20 due to eccentricity 60, resulting in the disk and the servo wedges 8 turning with eccentricity. When this occurs, the servo wedges 8 show a variation in track number, thereby causing problems in both the reading and writing of data to the disk.

FIG. 2 illustrates one embodiment of a method of determining disk eccentricity. The following discussion of the method of operation of test system 5 is provided in reference to FIGS. 1A, 1B and 2. In one embodiment, the displacement monitor 30 is used in the test system 5 to measure a runout of the outer diameter (OD) 21 of disk 20 with the displacement monitor 30 being in a first fixed angular position 33, step 210. In one embodiment, the displacement monitor is a capacitance probe. The measurement of disk runout using a capacitance probe is known in the art, for example, as discussed in "New frequency domain method of nonrepeatable runout measurement in a hard disk drive spindle motor," G. Jang, D. Kim, and J. E. Oh, IEEE Transactions on Magnetics 35, 833-838 (1999). Accordingly, a more detailed discussion of measuring disk runout is not provided herein. Alternatively, other types of displacement monitors (e.g., a laser displacement probe) and other disk runout measurement techniques as is known in the art may be used.

The recording head 40, under the control of controller 50 is used to decode the servo pattern information of servo wedges 8 (e.g., the wedge number from field 8a and the track number from field 8b) with the recording head 40 being maintained in a fixed angular position 43 near the OD 21 of the disk 20, step 220. The controller 50 may then correlate the runout data received from the displacement monitor 30 and the decoded servo pattern information to determine deviation information of the center 9 of the servo pattern from the center 29 of the disk, step 230. In one embodiment, such correlation may include determining an eccentricity of the servo pattern on the disk 20 based on the deviation information, step 240, and aligning the angles 33 and 43 at which, respectively, the OD runout is measured by displacement monitor 30 and the servo pattern information is decoded by recording head 40, step 250. Further details regarding the method illustrated in FIG. 2 are provided below.

FIG. 3 is a plot illustrating an example runout of preformatted servo pattern information of a disk, according to one embodiment of the present invention. In this embodiment, the track number (from track identification field 8b) and servo wedge number (from wedge identification field 8a) is the servo information that is decoded with recording head 40 at a fixed angular position 43 and fixed radius (e.g., near the OD 21) of the disk 20. Plot 300 charts the track number (#) 310 on the y-axis versus the wedge #320 on the x-axis. The diamond data points 340 shows a sinusoidal variation due to the eccentricity of an exemplary track with respect to the center 29 of the disk 20. Although some points may be misdetected (e.g., point 341), a sinusoidal curve 350 is fit formed by the square points to the properly detected data. In this example, there are 120 wedges/revolution of disk 20, approximately 400 tracks, and the average track number is 43597. Alternatively, other numbers of wedges, tracks and track numbers may be used.

FIG. 4 is a plot illustrating an example conversion of servo wedge data to a radial deviation, according to one embodiment of the present invention. Plot 400 charts the radial deviation in microns (μm) 410 on the y-axis versus the angle 420 in degrees of the recording head 40. The radial deviation from the disk OD 21 versus angle for each of the tracks is plotted as curve 440. The servo wedges 8 information may be converted to a radial deviation by calculation according to a formula. In this example embodiment, the radial deviation 450 is approximately equal to (the track #−the average track #)×the track pitch. In one example embodiment, the track #−the average track # is approximately 400 and the track pitch is approximately 0.15 μm. Accordingly, in this example embodiment, the maximum radial deviation 450 may be determined to be approximately equal to 60 μm (i.e., 400× 0.15). After the conversion, the relative radius of the servo wedges and disk OD may be determined as discussed below in regards to FIG. 5.

Figure 5:
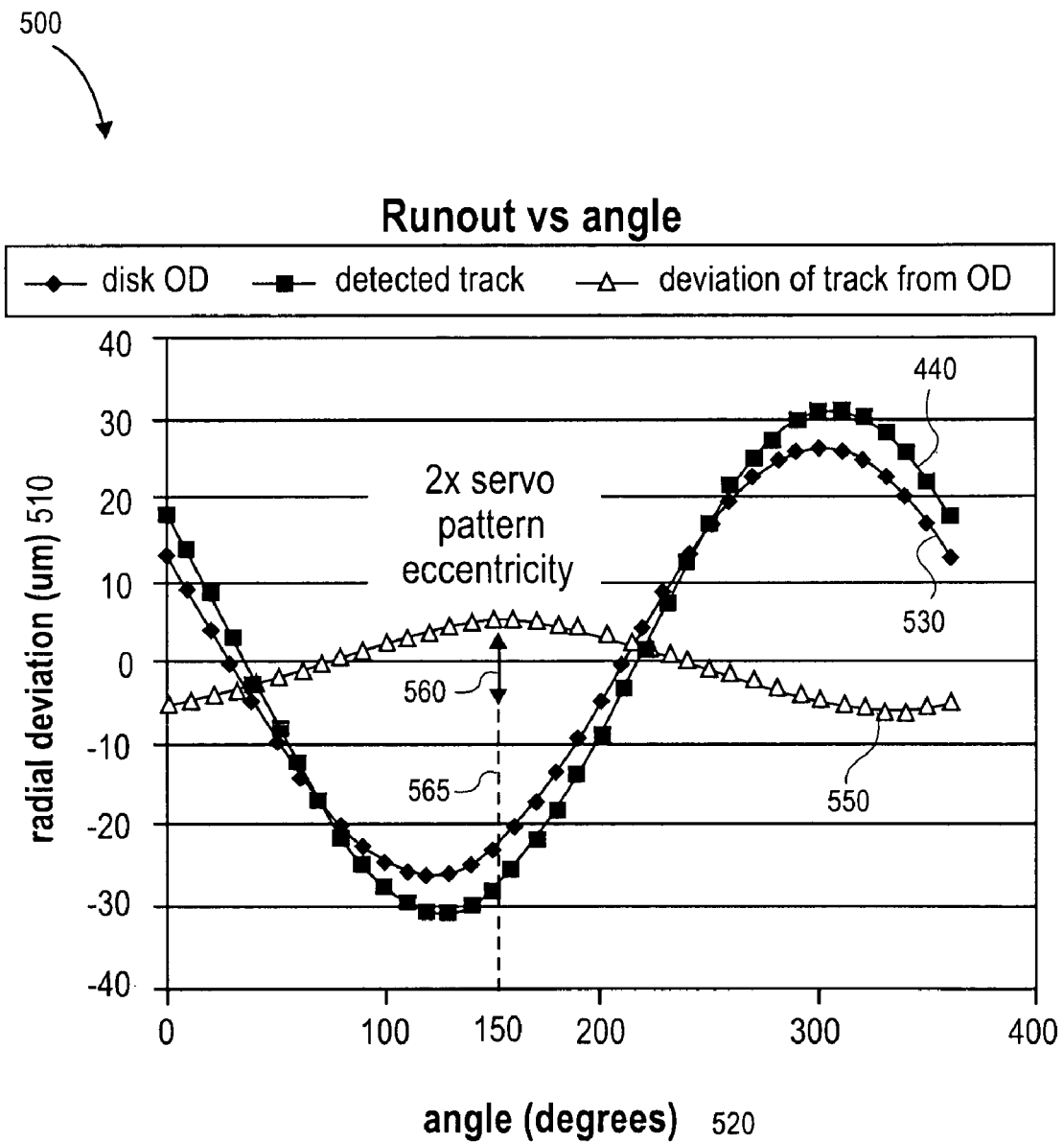
FIG. 5 is a plot illustrating an example correlation of the runout versus angle of the recording head, according to one embodiment of the present invention.

FIG. 5 is a plot illustrating an example correlation of the runout versus angle of the recording head 40, according to one embodiment of the present invention. Plot 500 charts the radial deviation in microns 510 on the y-axis versus the recording head 40 angle in degrees 520 for the disk 21 (curve 530) and a detected track 17 (curve 440). Curve 530 is an exemplary runout from the disk OD 21, as determined by step 210. Curve 440 is the radial deviation from the disk OD 21 versus angle for each of the tracks. Curve 550 is the difference between curves 440 and 530, which is the deviation information of the servo wedges 8 radial locations relative to the disk OD 21. In one embodiment, the eccentricity 60 of the disk 20 may be determined to be equal to 0.5 times a peak-to-peak deviation 560 of the deviation information curve 550. The wedge # at which the eccentricity is determined may then be back calculated from the data. In one embodiment, an angle of maximum deviation 565 may be determined from the deviation information. In this example embodiment, the angle of maximum deviation can be seen from an inspection of FIG. 5 to occur at approximately 150 degrees. In one embodiment, only a single revolution of data with the recording head 40 at a single fixed angular position 43 need be captured. In such an embodiment, the radial deviation of a particular track on disk 20 can be inferred from the single revolution data. Alternatively, data for more than one revolution of disk 20 or more than one fixed angular position for recording head 40 may be captured and used to determine deviation information.

It should be noted that a hard disk drive (HDD) system may typically be designed such that the concentricity with respect to the inner diameter of a disk is of primary concern. Nevertheless, the OD 21 and ID 22 of a disk may be assumed to be concentric within a given specification, and accordingly, the eccentricity relative to the ID 22 of the disk can be inferred from the eccentricity relative to the OD 21 of a disk.

As discussed above in regards to FIG. 2, in step 250, the angle 33 at which the OD runout is measured by displacement monitor 30 and the angle 43 at which the servo pattern information is decoded by recording head 40, is aligned. In one embodiment, such an alignment may performed by utilizing the known first angular position 33 of the displacement monitor 30 and the second fixed angular position 43 of recording head 40 to calculate an angular difference 53 between the two positions as illustrated in FIG. 2. It should be noted that any known angular relationship between angles 33 and 43 may be used. Alternatively, other methods may be used for alignment, for example, as discussed below in relation to FIGS. 6 and 7.

Figure 6:
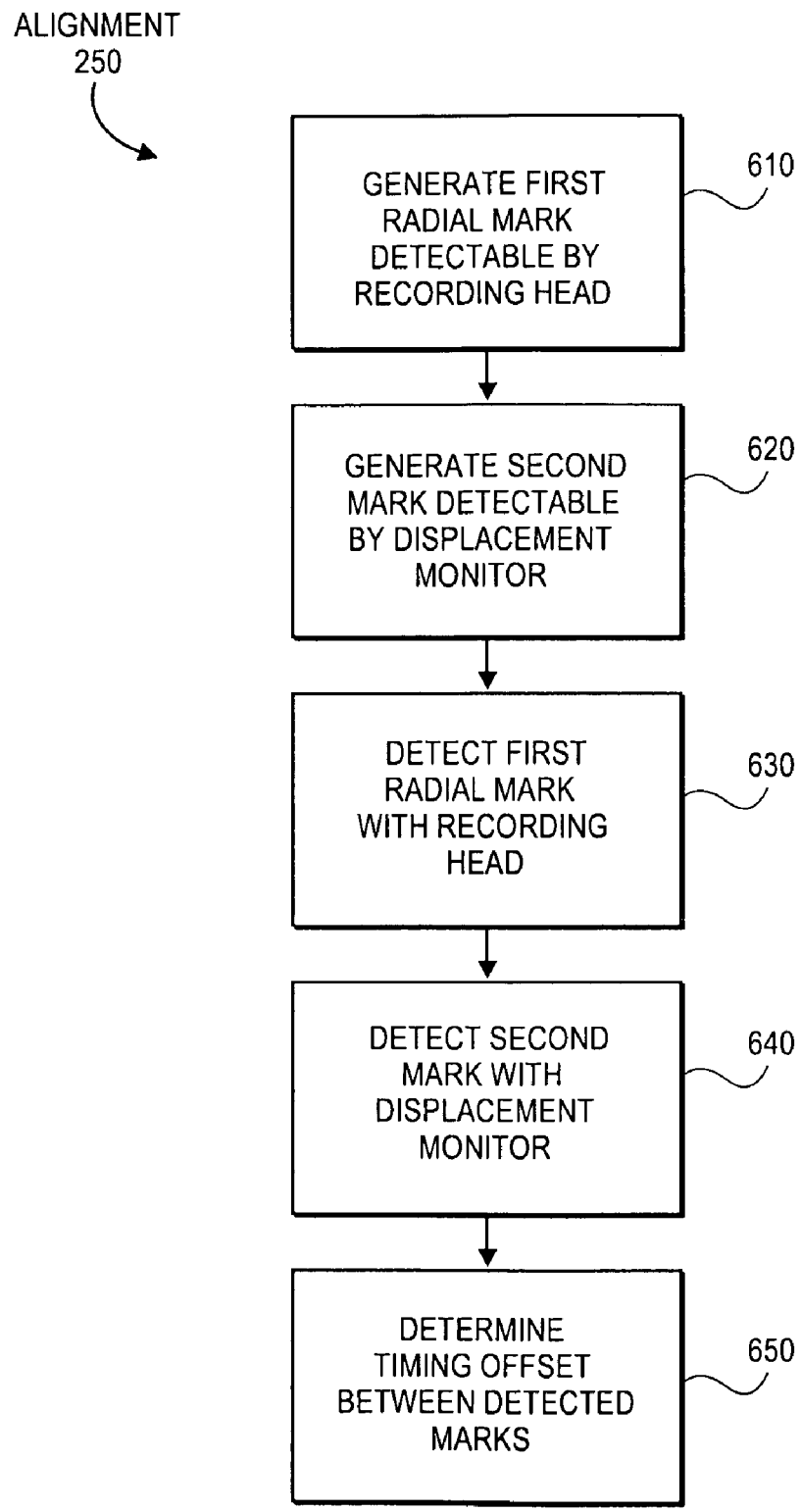
FIG. 6 is a flow chart illustrating one embodiment of a method to align the angles at which the OD runout is measured and the servo pattern information is decoded.

FIG. 6 is a flow chart illustrating one embodiment of a method to align the angles at which the OD runout is measured and the servo pattern information is decoded. In this embodiment, for example, alignment 250 can be performed by generating a radial mark 49 on the surface of the disk 20 which can be detected by the recording head 40, step 610, and generating a second mark 39 on the edge of the disk 20 which can be detected by the displacement monitor, step 620, with the second mark 39. In one embodiment, the radial mark 49 and the second mark 39 may be at different angular positions on disk 20 as illustrated in FIG. 1A. It should be emphasized that radial mark 49 is on the surface of the disk 20, underneath recording head 40. Accordingly, FIG. 1A illustrates a transparent view of recording head 40 in order to be able to see radial mark 49 disposed underneath. Alternatively, mark 49 may be disposed at the same angular position on disk 20 as mark 39. The marks 39 and 49 may be generated by one or more marking tools associated with test system 5 or by alternative means, for example, a user using a hand marking tool.

Next, the method proceeds with detecting the first radial mark 49 on the surface of the disk 20 with the recording head 40, step 630, and detecting the second mark 39 on the OD 21 edge of disk 20 with the displacement monitor 30, step 640. A timing offset between the detections of the first mark 49 and second mark 39 by the recording head 40 and the displacement monitor 30 may then be determined, step 650. Such a timing offset then enables the alignment of the measured OD runout and the decoded servo pattern information.

Figure 7:
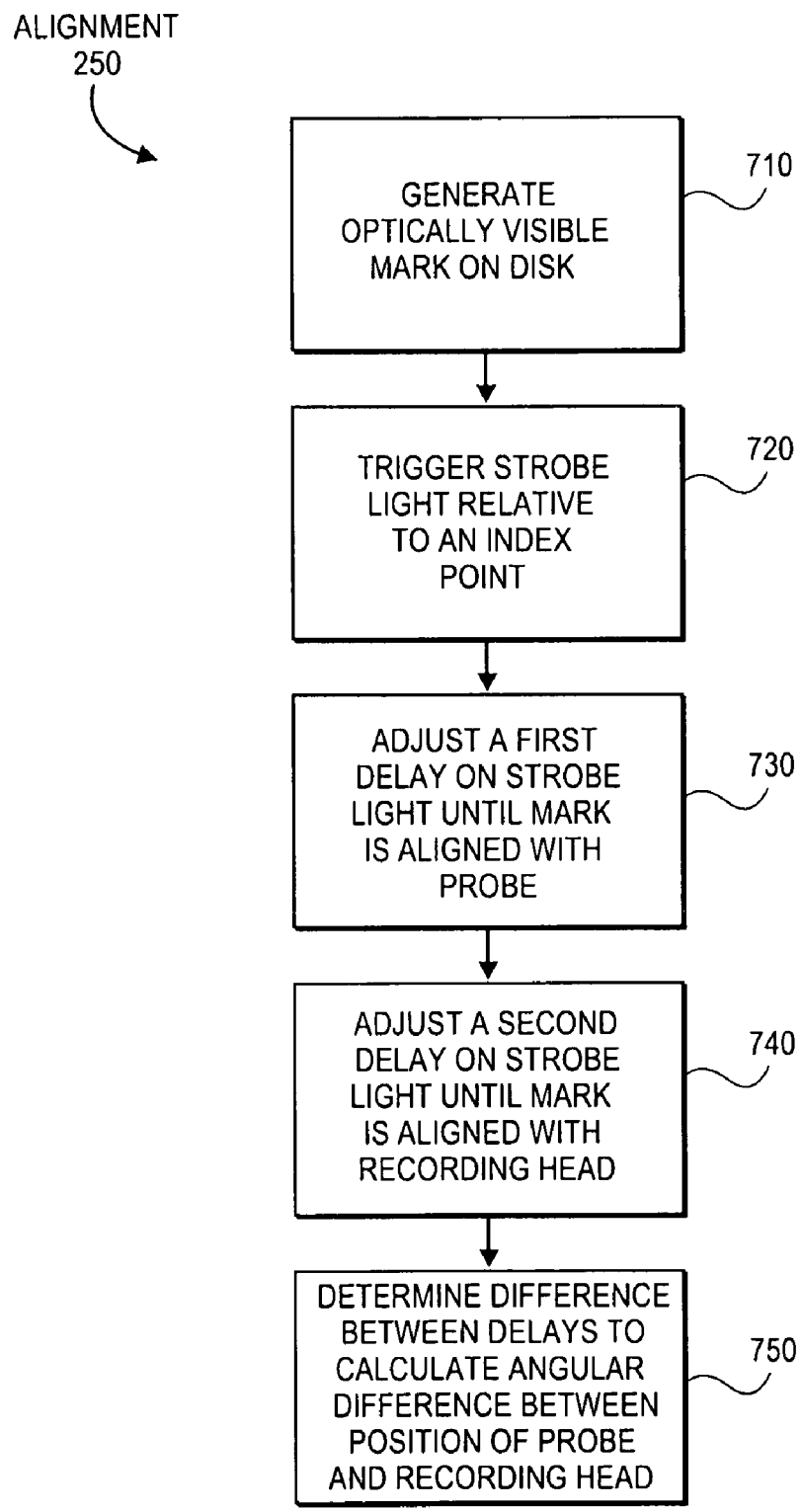
FIG. 7 is a flow chart illustrating an alternative embodiment of a method to align the angles at which the OD runout is measured and the servo pattern information is decoded.

FIG. 7 is a flow chart illustrating an alternative embodiment of a method to align the angles at which the OD runout is measured and the servo pattern information is decoded. In this embodiment, mark 705 of FIG. 1A may be an optically visible mark. The alignment method 250 includes generating the optically visible mark 705 on the disk 20, step 710, and triggering a strobe light 35 relative to an index point (e.g., spindle index 706) to image the optically visible mark 705, step 720. The generation of an optically visible mark is known in the art; accordingly, further details are not provided.

Next, a first delay on the strobe light 35 is adjusted until the mark is aligned with the displacement monitor 30, step 730. Then, a second delay on the strobe light 35 is adjusted until the mark 705 is aligned with the recording head 40, step 740.

It should be noted that the operation of strobe lights and the manner in which strobe light delay adjustments are made are known in the art; accordingly, a detailed discussion is not provided herein.

A difference between the first and second delays may then be determined to calculate an angular difference between the first fixed angular position 33 of the displacement monitor 30 and the second fixed angular position 43 of the recording head 40, step 750. Such an angular difference enables the alignment of the measured OD runout and the decoded servo pattern information.

It should be noted that although reference may be made in the above described embodiment to a particular type of displacement monitor being a capacitance probe, in alternative embodiments, other types of displacement monitors (e.g., a laser displacement probe) may be used.

It should be noted that alternative embodiments of the present invention may be applied with other types of servo pattern eccentricity, for example, the eccentricity of a servo pattern written on a standard servo track writer could be measured using the method described above if a hard disk drive were disassembled to gain access to the disk therein.

Embodiments of the present invention include various operations, which are described herein. These operations may be performed by hardware components, software, firmware or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses Certain embodiments of the methods described above may be implemented as a computer program product that may include instructions stored on a machine-readable medium. These instructions may be used to program controller 50 to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. Additionally, some operations may be repeated within an iteration of a particular method.

Although these embodiments have been described in language specific to structural features and methodological acts, it is to be understood that the invention defined in the appended claims is not necessarily limited to the specific features or acts described in particular embodiments. The specific features and acts disclosed are to be understood as particularly graceful implementations of the claimed invention in an effort to illustrate rather than limit the present invention.

What is claimed is:

1. A method, comprising:
    measuring a runout of an outer diameter (OD) of a disk versus angular position with a displacement monitor in a first fixed angular position;
    decoding servo pattern information of the disk with a recording head in a second fixed angular position; and
    correlating the runout and the servo pattern information to determine deviation information of a center of the servo pattern from a center of the disk defined by the OD,
    wherein correlating comprises determining an eccentricity of the servo pattern on the disk based on the deviation information.

2. The method of claim 1, wherein the displacement monitor is a capacitance probe.

3. The method of claim 1, wherein the servo pattern information comprises servo wedges and wherein decoding comprises converting the servo wedges to a radial deviation.

4. The method of claim 1, wherein the deviation equals (a track number of the servo pattern information minus an average track number) times (a track pitch of the servo pattern information).

5. The method of claim 1, wherein the eccentricity equals 0.5 times a peak-to-peak deviation of the deviation information.

6. The method of claim 1, further comprising determining an angle of maximum deviation from the deviation information.

7. The method of claim 1, further comprising aligning the first fixed angular position of the displacement monitor and the second fixed angular position of the recording head to correlate the runout and the servo pattern information.

8. The method of claim 7, wherein aligning comprises:
    utilizing known first and second fixed angular positions of the displacement monitor and recording head, respectively, during the measuring and decoding; and
    calculating an angular difference between the first and second fixed angular positions.

9. The method of claim 7, wherein aligning comprises:
    generating a radial mark on the surface of the disk which can be detected by the recording head;
    generating a second mark on the edge of the disk which can be detected by the displacement monitor;
    detecting the first radial mark on the surface of the disk with the recording head;
    detecting the second mark on the OD edge of the disk with the displacement monitor; and
    determining a timing offset between the first and second marks when detected by the recording head and the displacement monitor.

10. The method of claim 7, wherein aligning comprises:
    identifying an index mark on the disk;
    aligning the index mark with the recording head having a first delay from the spindle index;
    aligning the index mark with the displacement monitor having a second delay from the spindle index; and
    determining a difference between the first and second delays to calculate an angular difference between the first fixed angular position of the displacement monitor and the second fixed angular position of the recording head.

11. The method of claim 1, further comprising performing the steps of method 1 for a plurality of the disks.

12. The method of claim 11, further comprising statistically monitoring the deviation information from the plurality of disks.

13. The method of claim 1, wherein the displacement monitor is a laser displacement probe.

14. The method of claim 7, wherein aligning comprises:
    generating an optically visible mark on the disk;
    triggering a strobe light relative to an index point to image the optically visible mark;
    adjusting a first delay on the strobe light until the mark is aligned with the displacement monitor;
    adjusting a second delay on the strobe light until the mark is aligned with the recording head; and
    determining a difference between the first and second delays to calculate an angular difference between the first fixed angular position of the displacement monitor and the second fixed angular position of the recording head.

15. An apparatus, comprising:
    a spindle configured to secure and rotate a disk;
    a recording head configured to detect a first radial mark on the surface of the disk;
    a displacement monitor configured to detect a second mark on the OD edge of the disk; and
    a controller operatively coupled with the displacement monitor, the spindle, and the recording head to measure a runout of an outer diameter (OD) of the disk versus angular position with the displacement monitor in a first fixed angular position, the controller further configured to decode servo pattern information of the disk with the recording head in a second fixed angular position and correlate the runout and the servo pattern information to determine deviation information of a center of the servo pattern from a center of the disk defined by the OD,
    wherein correlating comprises determining an eccentricity of the servo pattern on the disk based on the deviation information.

16. The apparatus of claim 15, wherein the first fixed angular position of the displacement monitor and the second fixed angular position of the recording head are aligned to correlate the runout and the servo pattern information and wherein the processing device is configured to determine a timing offset between the first and second marks when measured by the recording head and the displacement monitor.

17. The apparatus of claim 15, wherein the displacement monitor is a laser displacement probe.

18. The apparatus of claim 15, wherein the displacement monitor is a capacitance probe.

* * * * *